(12) United States Patent
Wagner et al.

(10) Patent No.: US 12,442,894 B2
(45) Date of Patent: Oct. 14, 2025

(54) RADAR DEVICE AND METHOD FOR DETECTING HARDWARE FAULTS OF A RADAR DEVICE

(71) Applicant: Infineon Technologies AG, Neubiberg (DE)

(72) Inventors: Matthias Wagner, Engerwitzdorf (AT); Alexander Melzer, Neutillmitsch (AT)

(73) Assignee: Infineon Technologies AG, Neubiberg (DE)

( * ) Notice: Subject to any disclaimer, the term of this patent is extended or adjusted under 35 U.S.C. 154(b) by 428 days.

(21) Appl. No.: 17/852,794

(22) Filed: Jun. 29, 2022

(65) Prior Publication Data

US 2023/0014179 A1    Jan. 19, 2023

(30) Foreign Application Priority Data

Jul. 7, 2021    (DE) .......................... 102021117540.2

(51) Int. Cl.
*G01S 7/40*    (2006.01)
*G01S 7/35*    (2006.01)
*G01S 13/58*    (2006.01)
*H04B 17/19*    (2015.01)

(52) U.S. Cl.
CPC ............ *G01S 7/4017* (2013.01); *G01S 7/354* (2013.01); *G01S 7/356* (2021.05); *G01S 13/584* (2013.01); *H04B 17/19* (2015.01)

(58) Field of Classification Search
None
See application file for complete search history.

(56) References Cited

U.S. PATENT DOCUMENTS

| 10,097,287 | B1 | 10/2018 | Schat et al. |
| 11,215,693 | B2* | 1/2022 | Statnikov ................ G01S 7/414 |
| 2011/0156783 | A1* | 6/2011 | Pavlovic ................. H03L 7/081 327/159 |
| 2013/0113653 | A1* | 5/2013 | Kishigami ............. G01S 7/285 342/189 |
| 2013/0234879 | A1* | 9/2013 | Wilson-Langman ....................... G01S 13/885 342/21 |
| 2017/0168138 | A1* | 6/2017 | Steinbuch ................ G01S 7/03 |

(Continued)

FOREIGN PATENT DOCUMENTS

DE    102017119212 A1    6/2018

OTHER PUBLICATIONS

Li, Z., et al., "On the Leakage of FMCW Radar Front-End Receiver," IEEE, 2021, pp. 1-4.

(Continued)

*Primary Examiner* — Robert W Hodge
*Assistant Examiner* — Brandon James Henson
(74) *Attorney, Agent, or Firm* — Harrity & Harrity, LLP

(57) ABSTRACT

The present disclosure relates to a radar device, including a transmitter circuit configured to generate an RF oscillator signal and to transmit an RF fault detection signal based on the RF oscillator signal, a receiver circuit configured to receive an RF reception signal based on the RF fault detection signal and to mix the RF reception signal with the RF oscillator signal in order to obtain a down-converted reception signal, and a fault detection circuit configured to detect a hardware fault of the radar device based on a phase of the down-converted reception signal.

26 Claims, 8 Drawing Sheets

(56) References Cited

U.S. PATENT DOCUMENTS

| | | | |
|---|---|---|---|
| 2019/0334640 A1* | 10/2019 | Belfiore | H04B 1/40 |
| 2020/0382170 A1 | 12/2020 | Lang et al. | |
| 2021/0109193 A1* | 4/2021 | Tsutsumi | G01S 13/343 |
| 2022/0196791 A1* | 6/2022 | Doaré | G01S 7/4008 |

OTHER PUBLICATIONS

Schnabel, Raik, et al. "An ISO 26262 compliant built-in self-test for 77 GHz automotive radar sensors," 2013 European Radar Conference, 2013, pp. 216-219.

* cited by examiner

RADAR DEVICE AND METHOD FOR DETECTING HARDWARE FAULTS OF A RADAR DEVICE

FIELD

The present disclosure relates generally to radar devices and in particular to devices and methods for detecting hardware faults of a radar device.

BACKGROUND

Radar sensors are used in a multiplicity of applications for detecting objects (so-called radar targets), wherein the detecting usually comprises measuring distances and speeds of the detected objects. In the automotive field, in particular, there is an increasing need for radar sensors which can be used, inter alia, in driving assistance systems (Advanced driver assistance systems, ADAS) such as e.g. in cruise control (ACC, Adaptive Cruise Control, or Radar Cruise Control) systems. Such systems can automatically adapt the speed of an automobile in order thus to maintain a safe distance from other automobiles ahead (and also other objects and pedestrians). Further applications in the automotive field are e.g. blind spot detection, lane change assist and the like. In the field of autonomous driving, radar sensors will play an important part for the control of autonomous vehicles.

Precise detection of objects in the measurement range of a radar sensor generally requires a radar system comprising a plurality of transmitting and receiving channels. Such radar systems are usually referred to a MIMO (multiple input multiple output) radar systems. MIMO systems are required particularly if the intention is to determine not only the distance and the speed of an object but also the azimuth angle thereof. Signal processing techniques generally referred to as beamforming techniques can be used for ascertaining the azimuth angle assigned to a radar target.

The use of beamforming techniques allows the formation of virtual antenna arrays comprising virtual receiving antennas and virtual receiving channels assigned thereto. By way of example, in a radar system comprising eight (real) transmitting channels (TX channels) and four (real) receiving channels, it is possible to form a virtual antenna array comprising 32 (eight times four) virtual receiving antennas. For this purpose, however, it is important for the relative phases of the transmission signals emitted via the TX channels to be known.

Radar circuits are often realized by means of monolithic microwave integrated circuits (MMICs). MMICs are circuits for operation at microwave frequencies that are integrated into small housings. The term microwave frequencies often denotes the range of 300 MHz to 300 GHz in the radiofrequency spectrum. Radar MMICs are used inter alia in automotive applications for capturing the surroundings within and around the automobile. Surrounding objects can be identified by capturing the surroundings using MMICs.

MMICs are generally connected to a printed circuit board (PCB) via solder balls. Breaks of these solder balls, so-called ball breaks (BBs), can result in a phase deviation and a damping of transmission and/or reception signals. Some radar processing steps, such as the abovementioned angle estimation of targets, for example, are greatly dependent on reception signal phases. Therefore, a phase deviation induced by ball breaks can greatly reduce the sensor performance.

Ball break detection can conventionally be effected by measuring a DC resistance with respect to ground at the pad of an Rx input. In CMOS (Complementary Metal Oxide Semiconductor), however, this detection concept would result in a significant deterioration in the noise figure.

Therefore, there is a need for detection of ball breaks or similar conduction defects.

SUMMARY

This need is met by devices and methods as claimed in the independent claims. The dependent claims relate to advantageous developments.

In accordance with a first aspect of the present disclosure, a radar device is proposed. The radar device includes a transmitter circuit, configured to generate a microwave or radiofrequency oscillator signal (RF oscillator signal) and to transmit an RF fault detection signal based on the RF oscillator signal. The radar device furthermore includes a receiver circuit configured to receive an RF reception signal based on the RF fault detection signal and to mix the RF reception signal with the RF oscillator signal in order to obtain a down-converted reception signal. The radar device furthermore includes a fault detection circuit configured to detect a hardware fault of the radar device based on a phase of the down-converted reception signal. By way of example, the hardware fault can be detected based on a change (caused by the hardware fault) in the phase of the down-converted reception signal.

By means of radar devices in accordance with the present disclosure, for example, conduction defects and/or solder joint defects (ball breaks) in transmitting and/or receiving paths of the radar device can be detected based on the phase of down-converted reception signals. It will be immediately apparent to the person skilled in the art that the present disclosure is not just limited to radar devices or radar applications, rather that the concepts presented here may also be suitable for other transceiver circuits, such as, for example, for time-of-flight (ToF) systems, or Lidar sensors.

In accordance with some exemplary embodiments, the fault detection circuit is configured to determine the phase of the down-converted reception signal based on a discrete Fourier (DFT) transform of the down-converted reception signal. A (DFT) can be used in signal processing for example for ascertaining the frequencies that principally occur in a sampled signal and/or for ascertaining the amplitudes and the associated phase angle with respect to these frequencies. Optimized variants in the form of a fast Fourier transform (FFT) can be employed for this purpose. In radar applications, multiple FFTs are often used for ascertaining distance (range), speed (Doppler) and angle of the radar targets.

In accordance with some exemplary embodiments, the fault detection circuit is configured to determine a discrete spectral component of the down-converted reception signal that corresponds to the RF fault detection signal based on a Goertzel algorithm and to detect the hardware fault based on the phase of the discrete spectral component. A discrete spectral component arises for example if the RF fault detection signal has a known, dedicated CW component (CW=Continuous Wave). The Goertzel algorithm constitutes a special form of the DFT. In contrast to various fast calculation methods in the case of the discrete Fourier transform (FFT), which calculate all discrete spectral components in a block (bin), with the Goertzel algorithm it is possible to calculate just individual discrete spectral components (frequency, amplitude, phase) of the fault, detection signal.

In accordance with some exemplary embodiments, the transmitter circuit is configured to generate the RF fault detection signal with a predetermined frequency offset with respect to the RF oscillator signal. That is to say that the RF fault detection signal can correspond to the RF oscillator signal shifted by the frequency offset. In this case, it is advantageous if the frequency offset lies within a passband of a high-pass or bandpass filter of the receiver circuit. The frequency offset should thus lie above a lower cutoff frequency of a high-pass filter or within the cutoff frequencies of a bandpass filter of the receiver circuit.

In accordance with some exemplary embodiments, the transmitter circuit is configured to generate the RF oscillator signal as a frequency-modulated continuous wave radar signal (FMCW). FMCW radar signals can advantageously find application in the automotive sector, in particular. An FMCW signal can enable an isolation of the RF fault detection signal from other radar targets.

In accordance with some exemplary embodiments, the transmitter circuit is configured to transmit the RF fault detection signal during predetermined fault detection timeslots. That means, for example, that during the fault detection timeslots the RF fault detection signal can be transmitted with a predetermined frequency offset with respect to the RF oscillator signal. Outside the fault detection timeslots, the RF oscillator signal can be transmitted for target acquisition. Consequently, hardware fault detection can be carried out periodically (in the fault detection timeslots) even during radar operation.

In accordance with some exemplary embodiments, the fault detection circuit is configured to detect the hardware fault based on the phase of a spectral component of the down-converted reception signal that corresponds to the frequency offset. By way of example, an FFT bin corresponding to the frequency offset could be evaluated or the spectral component (or the phase thereof) of the down-converted reception signal that corresponds to the frequency offset can be evaluated directly by way of the Goertzel algorithm.

In accordance with some exemplary embodiments, the fault detection circuit is configured to detect the hardware fault based on a comparison of the phases of the down-converted reception signal of two successive fault detection timeslots. A phase change on account of the hardware fault can thus be detected. For this purpose, the radar device can have a memory (for example FIFO memory), in order to store at least one phase value of a past fault detection timeslot.

In accordance with some exemplary embodiments, the fault detection circuit is configured to detect the hardware fault if a comparison value of the phases of the down-converted reception signals of two successive fault detection timeslots exceeds a predetermined threshold value or lies outside a predetermined tolerance range. Optionally, phase values of earlier fault detection timeslots can also be used for this purpose. In other words, if a hardware fault, for example in the form of a ball break, occurs during the operation of the radar device, this can be detected and signaled by a deviation of successive phase values.

As has already been mentioned in the introduction, MIMO concepts having a plurality of transmitting and/or receiving paths are often used in present-day radar applications. Accordingly, in accordance with some exemplary embodiments, the transmitter circuit can include a first and at least one second transmitting path and be configured to transmit a respective RF fault detection signal based on the RF oscillator signal via one or more of the transmitting paths during predetermined fault detection timeslots (in parallel or by way of time division multiplexing). The receiver circuit can then be configured to receive the respective RF fault detection signal during the fault detection timeslots and to mix it with the RF oscillator signal in order to obtain a respective down-converted reception signal. The fault detection circuit can be configured to detect the hardware fault based on a phase of a signal component of the respective down-converted reception signal that corresponds to the respective RF fault detection signal. As has already been described above, the respective RF fault detection signals can be generated with a predetermined frequency offset with respect to the RF oscillator signal. Hardware faults, for example in the form of a ball break or some other conduction defect, of the receiving path or of the different transmitting paths can thus be detected.

In accordance with some exemplary embodiments, the transmitter circuit is configured to transmit a first RF fault detection signal via the first transmitting path during a first fault detection timeslot and to transmit a second RF fault detection signal via the second transmitting path during a second fault detection timeslot following the first fault detection timeslot. The receiver circuit is configured to receive the first RF fault detection signal during the first fault detection timeslot and to mix it with the RF oscillator signal in order to obtain a first down-converted reception signal, and to receive the second RF fault detection signal during the second fault detection timeslot and to mix it with the RF oscillator signal in order to obtain a second down-converted reception signal. The fault detection circuit is configured to determine a first phase of a signal component of the first down-converted reception signal that corresponds to the first RF fault detection signal during the first fault detection timeslot, to determine a second phase of a signal component of the second down-converted reception signal that corresponds to the second RF fault detection signal during the second fault detection timeslot, and to determine the hardware fault based on the first and second phases. By way of example, the fault detection circuit can be configured to detect the hardware fault based on a comparison of the first phases of the down-converted reception signals of two successive first fault detection timeslots of the first transmitting path and/or to detect the hardware fault based on a comparison of the second phases of the down-converted reception signals of two successive second fault detection timeslots of the second transmitting path.

In accordance with some exemplary embodiments, the receiver circuit includes a first and at least one second receiving path and is configured to receive a respective RF fault detection signal based on the RF oscillator signal via one or more of the receiving paths during predetermined fault detection timeslots (by way of time division multiplexing or in parallel) and to mix it with the RF oscillator signal in order to obtain a respective down-converted reception signal. The fault detection circuit is configured to detect the hardware fault based on a phase of a signal component of the respective down-converted reception signal that corresponds to the RF fault detection signal. As has already been described above, the RF fault detection signal can be generated with a predetermined frequency offset with respect to the RF oscillator signal. Hardware faults, for example in the form of a ball break or some other conduction defect, of the different receiving paths or of the transmitting path can thus be detected.

In accordance with some exemplary embodiments, the receiver circuit is configured to receive an RF fault detection signal via the first receiving path during a first fault detection timeslot and to receive the RF fault detection signal via the second receiving path during a second fault detection timeslot. The fault detection circuit is configured to determine a first phase of a signal component of the down-converted reception signal that corresponds to the first receiving path during the first fault detection timeslot, to determine a second phase of a signal component of the down-converted reception signal that corresponds to the second receiving path during the second fault detection timeslot, and to determine the hardware fault based on the first and second phases. By way of example, the fault detection circuit can be configured to detect the hardware fault based on a comparison of the first phases of the down-converted reception signals of two successive first fault detection timeslots of the first receiving path and/or to detect the hardware fault based on a comparison of the second phases of the down-converted reception signals of two successive second fault detection timeslots of the second receiving path.

In accordance with some exemplary embodiments, the first and second fault detection timeslots can also be identical, i.e. take place at the same time.

In accordance with some exemplary embodiments, the transmitter circuit has a transmitting antenna and the receiver circuit has a receiving antenna, and wherein the RF fault detection signal undergoes crosstalk from the transmitting antenna to the receiving antenna. It is thus possible to utilize crosstalk from transmitting antenna to receiving antenna at the radar device.

In accordance with some exemplary embodiments, the transmitter circuit and the receiver circuit are integrated in a common MMIC. As a result, transmitter circuit and receiver circuit can access the same RF oscillator signal in a confined structural space (and therefore without a significant phase offset).

In accordance with some exemplary embodiments, the hardware fault includes RF signal conduction defects. In this case, the RF signal conduction defects can include solder joint defects, for example at the locations where the MMIC is soldered onto a printed circuit board (PCB).

In accordance with a further aspect of the present disclosure, a method for detecting hardware faults of a radar device is proposed. The method includes generating an RF oscillator signal, transmitting an RF fault detection signal based on the RF oscillator signal, receiving an RF reception signal based on the RF fault detection signal, mixing the RF reception signal with the RF oscillator signal in order to obtain a down-converted reception signal, and detecting the hardware fault based on a phase of the down-converted reception signal.

In accordance with some exemplary embodiments, the RF fault detection signal is transmitted with a predetermined frequency offset with respect to the RF oscillator signal.

In accordance with some exemplary embodiments, the RF fault detection signal is transmitted during predetermined fault detection timeslots. The RF oscillator signal is transmitted during predetermined target acquisition timeslots for target acquisition purposes. The fault detection timeslots can be embedded between target acquisition timeslots.

In accordance with some exemplary embodiments, the method furthermore includes determining a discrete spectral component of the down-converted reception signal that corresponds to the frequency offset based on the Goertzel algorithm, and detecting the hardware fault based on the phase of the discrete spectral component.

In accordance with some exemplary embodiments, the hardware fault is detected based on a comparison of the phases of the down-converted reception signals of two successive fault detection timeslots. Outside the fault detection timeslots, the RF oscillator signal can be transmitted (without a frequency offset) for target acquisition purposes. Consequently, hardware fault detection can be carried out periodically (in the fault detection timeslots) even during radar operation.

The proposed invention is based on external crosstalk between transmitting and receiving antennas. In this case, the transmission signal (Tx) penetrates the receiving antenna (Rx), is down-converted and generates a down-converted reception signal. Since this crosstalk passes through both the Tx solder ball and the Rx solder ball, its phase is shifted according to a possible ball break. BBs can be detected by evaluating the phase of the down-converted reception signal caused by the crosstalk. The proposed concept addresses a number of advantages. It has been found that, in contrast to damping, the ball break induced phase shift is constant with respect to the Tx signal frequency. Since the Tx signal may be a linear chirp, it sweeps over a specific frequency range, which would result in a non-constant damping of the down-converted reception signal. Considering that the effects of defective solder balls are small, the constant phase deviation can be detected more robustly than the fluctuating damping.

BRIEF DESCRIPTION OF THE DRAWINGS

Some examples of devices and/or methods are explained in greater detail merely by way of example below with reference to the accompanying figures, in which.

DETAILED DESCRIPTION

Some examples will now be described more thoroughly with reference to the accompanying figures. However, further possible examples are not restricted to the features of these embodiments described in detail. These may have modifications of the features and counterparts and alternatives to the features. Furthermore, the terminology used herein for describing specific examples is not intended to be limiting for further possible examples.

Throughout the description of the figures, identical or similar reference signs refer to identical or similar elements or features which can be implemented in each case identically or else in modified form, while they provide the same or a similar function. In the figures, furthermore, the thicknesses of lines, layers and/or regions may be exaggerated for elucidation purposes.

If two elements A and B are combined using an "or" this should be understood such that all possible combinations are disclosed, i.e. only A, only B and A and B, unless expressly defined otherwise in an individual case. As alternative wording for the same combinations, it is possible to use "at least one from A and B" or "A and/or B". That applies equivalently to combinations of more than two elements.

If a singular form, e.g. "a, an" and "the", is used and the use of only a single element is defined neither explicitly nor implicitly as obligatory, further examples can also use a plurality of elements in order to implement the same function. If a function is described below as being implemented using a plurality of elements, further examples can implement the same function using a single element or a single processing entity. Furthermore, it goes without saying that the term "comprises", "comprising", "has" and/or "having" in their usage describe the presence of the specified features, integers, steps, operations, processes, elements, components and/or a group thereof, but do not exclude the presence or the addition of one or more other features, integers, steps, operations, processes, elements, components and/or a group thereof.

Although aspects of the present disclosure are described predominantly with regard to frequency-modulated continuous wave radar systems (FMCW radar systems), it will be immediately apparent to the person skilled in the art that the principles described herein are also applicable to other radar technologies (e.g. CW radar, pulse radar, etc.).

Figure 1:
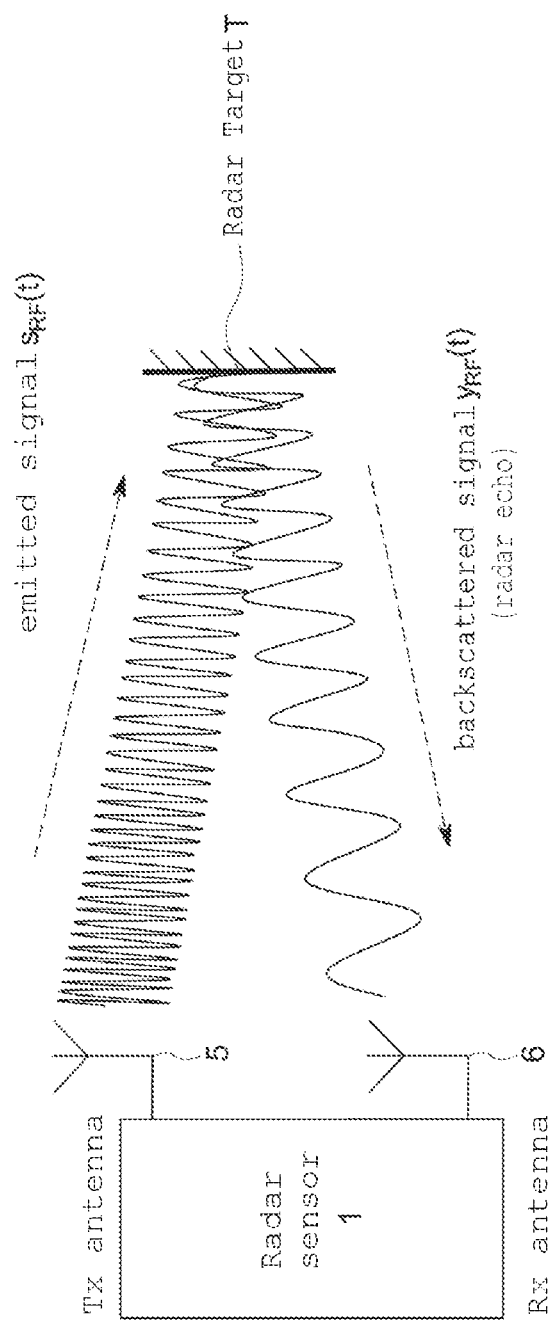
FIG. 1 shows a schematic diagram for illustrating the functional principle of an FMCW radar system for distance and/or speed measurement.

FIG. 1 illustrates, in a schematic diagram, the application of an FMCW radar system as sensor for the detection of objects, which are usually referred to as radar targets. The detection usually comprises ascertaining distance (also referred to as Range) and speed of the respective radar target. In order to localize a target even more accurately, modern radar systems are configured also to ascertain the azimuth angle of a target.

In the present example, the radar device 1 comprises separate transmitting (Tx) and receiving (Rx) antennas 5 and 6 respectively (bistatic or pseudo-monostatic radar configuration). It should be noted, however, that a single antenna can also be used, which serves simultaneously as Tx antenna and as Rx antenna (monostatic radar configuration). The Tx antenna 5 emits a continuous RF signal $s_{RF}(t)$, which is frequency-modulated for example with a type of sawtooth signal (periodic, linear frequency ramp). The emitted RF radar signal $s_{RF}(t)$ is backscattered at the radar target T and the backscattered/reflected signal $y_{RF}(t)$ (echo signal) is received by the Rx antenna 6. FIG. 1 shows a simplified example; in practice, radar sensors are usually systems comprising a plurality of Tx and Rx paths in order also to be able to ascertain the angle of incidence (Direction of Arrival, DoA) of the backscattered/reflected signals $y_{RF}(t)$, i.e. the abovementioned azimuth angle of the radar target T.

Figure 2:
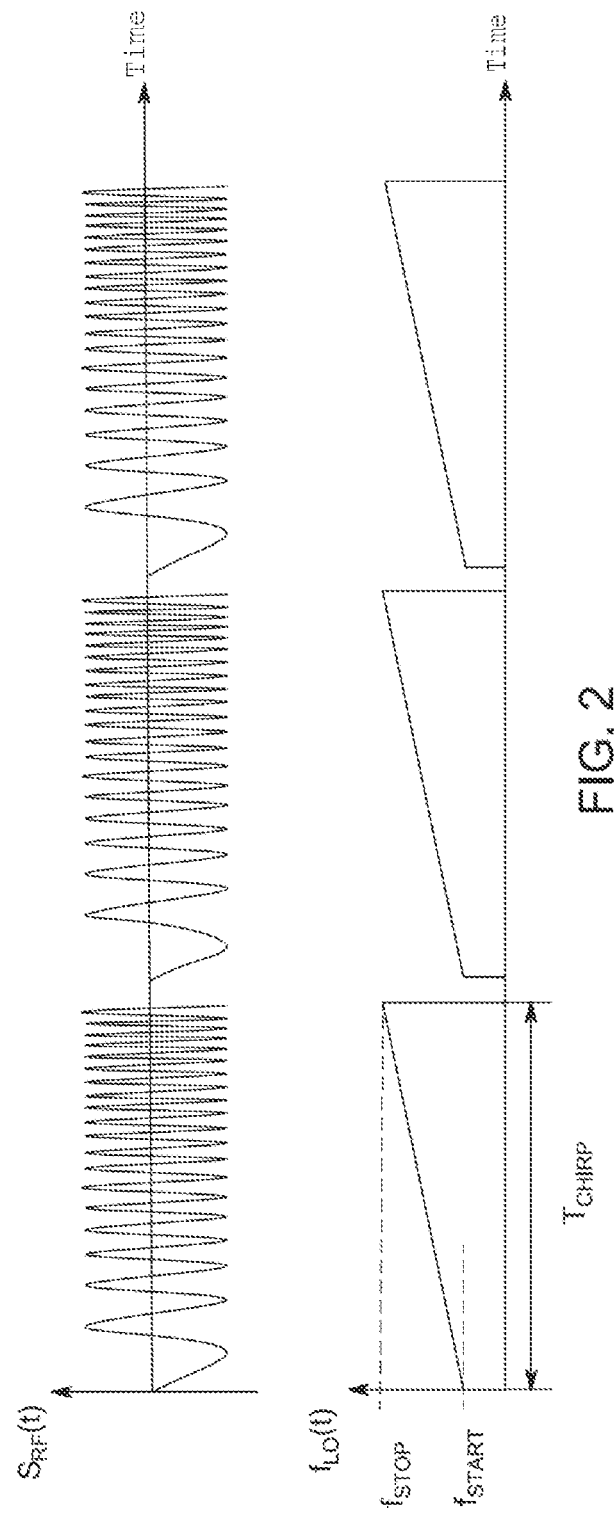
FIG. 2 comprises two timing diagrams for illustrating the frequency modulation (FM) of an RF signal generated by the FMCW system.

FIG. 2 illustrates by way of example the abovementioned frequency modulation of the signal $s_{RF}(t)$. As illustrated in FIG. 2 (upper diagram), the emitted RF signal $s_{RF}(t)$ is composed of a set of "chirps", that is to say that the signal $s_{RF}(t)$ comprises a sequence of sinusoidal signal profiles (waveforms) having a rising frequency (up-chirp) or a falling frequency (down-chirp). In the present example, the instantaneous frequency $f_{LO}(t)$ of a chirp beginning at a start frequency $f_{START}$ rises linearly within a time period $T_{CHIRP}$ to a stop frequency $f_{STOP}$ (see lower diagram in FIG. 2). Such chirps are also referred to as linear frequency ramps.

FIG. 2 illustrates three identical linear frequency ramps. It should be noted, however, that the parameters $f_{START}$, $f_{STOP}$, $T_{CHIRP}$ and also the pause between the individual frequency ramps (and thus the chirp repetition rate) can vary. The frequency variation also need not necessarily be linear (linear chirp). Depending on the implementation, transmission signals with exponential or hyperbolic frequency variation (exponential or hyperbolic chirps, respectively) can also be used, for example.

A radar echo signal $y_{RF}(t)$ received via an Rx antenna is a temporally shifted (delay time $\tau$) and scaled version of the radar signal $s_{RF}(t)$ emitted via the associated Tx antenna (cf. FIG. 1). In the case of linear chirps (frequency ramps), this delay time $\tau$ corresponds to a constant frequency offset $\Delta f$ between the emitted radar signal $s_{RF}(t)$ and the received radar echo signal $y_{RF}(t)$. The ratio $k=\Delta f/\tau$ corresponds to the gradient of the frequency ramp (hertz per second), which is in turn given by $k=B/T_{CHIRP}$ (bandwidth $B=|f_{START}-f_{STOP}|$). The frequency offset $\Delta f$ can be measured by means of known techniques and the following thus holds true for the delay time $\tau$ (i.e. the round-trip delay time of the radar signal from the Tx antenna to the Rx antenna):

$$\tau=\Delta f \cdot T_{CHIRP}/B=\Delta f/k. \qquad (1)$$

The round-trip delay time $\tau$ corresponds to a distance $x=c\tau$ (c denotes the speed of light) covered by the radar signal. The frequency offset $\Delta f$ measured by the radar device (by means of down-converting the radar echo signal and spectral analysis) contains information about the round-trip delay time $\tau$ of the radar signal and thus also about the path distance x covered by the radar signal.

Figure 3:
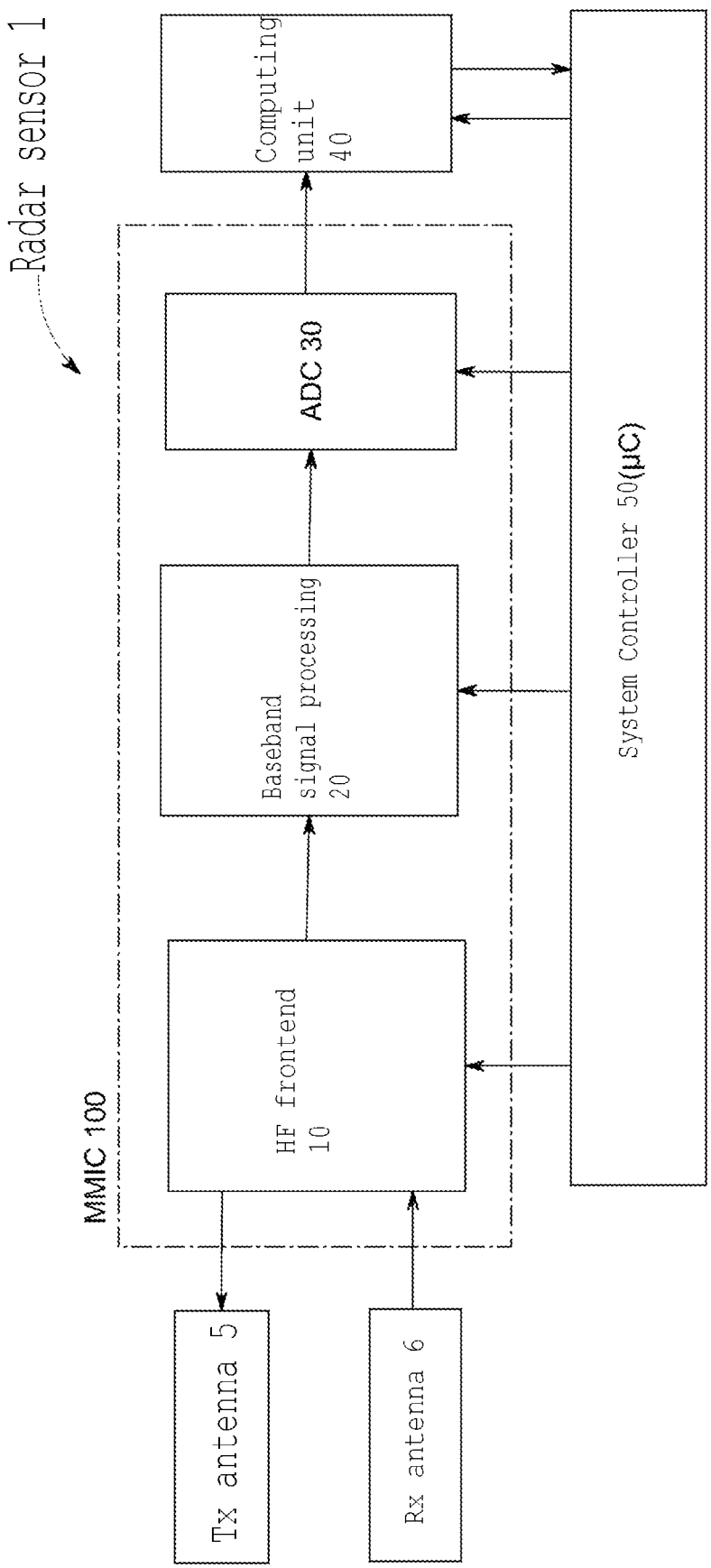
FIG. 3 shows a block diagram for illustrating the fundamental structure of an FMCW radar system.

FIG. 3 is a block diagram which schematically illustrates one possible structure of a radar device 1 (radar sensor). Accordingly, one or more transmitting antennas 5 (Tx antennas) and one or more receiving antennas 6 (Rx antennas) are connected to an RF frontend 10 which is integrated in a chip and which can include all those circuit components which are required for the RF signal processing. Said circuit components comprise for example a local oscillator (LO), RF power amplifiers, low-noise amplifiers (LNAs), directional couplers (e.g. rat race couplers, circulators, etc.) and mixers for the down-conversion of the RF signals to the baseband or an intermediate frequency band (IF band). The RF frontend 10—if appropriate together with further circuit components—can be integrated in one chip or in a plurality of chips, usually referred to as monolithic microwave integrated circuits (MMICs).

The example illustrated shows a bistatic (or pseudo-monostatic) radar system comprising separate Rx and Tx antennas. As mentioned, radar systems in practice usually comprise a plurality of transmitting and receiving paths having a plurality of Tx and Rx antennas, respectively, which makes it possible, inter alia, to measure the direction (Direction of Arrival, DoA) from which the radar echoes are received. In Multiple-Input Multiple-Output (MIMO) systems of this type, the individual (physical) Tx channels and Rx channels are usually constructed identically or similarly in each case. From a plurality of Tx antennas and Rx antennas, it is possible to form so-called virtual antenna arrays, which can be used for implementing beamforming techniques. By way of example, a system comprising three Tx antennas and four RX channels can be used to implement an antenna array comprising 12 (three times four) virtual antenna elements. The phase differences between the emitted antenna signals (or the RF output signals of the Tx channels) are of importance for the application of beamforming techniques.

In the case of an FMCW radar system, the RF signals emitted via the Tx antenna(s) 5 can lie e.g. in the range of approximately 20 GHz to 100 GHz (e.g. around 77 GHz in some applications). However, this range is merely one example and other frequencies are also possible. As mentioned, the RF signal received by each Rx antenna 6 comprises radar echoes (chirp echo signals), i.e. those signal components which are backscattered at one or at a plurality of radar targets. In each Rx channel, the received RF signal $y_{RF}(t)$ can be down-converted to the baseband and can be processed further in the baseband by means of analog signal processing (see FIG. 3, analog baseband signal processing chain 20). The analog signal processing mentioned can substantially comprise (bandpass) filtering and, if appropriate, amplification of the baseband signal. The baseband signal is finally digitized (see FIG. 3, analog-to-digital convertor 30) and processed further in the digital domain. The digital signal processing chain can be realized at least partly as software (e.g. firmware) which can be executed on one or on a plurality of processors, for example a microcontroller and/or a digital signal processor (see FIG. 3, computing unit 40).

The overall system can generally be controlled by means of a system controller 50, which can likewise be implemented at least partly by means of software/firmware which is executed on a processor such as e.g. a microcontroller. The RF frontend 10 and the analog baseband signal processing chain 20 (optionally also the analog-to-digital converter 30 and the computing unit 40) can be jointly integrated in a single MMIC (i.e. an RF semiconductor chip). Alternatively, the individual components can also be distributed among a plurality of MMICs. In order to simplify the illustration, and since it is not necessary for the further explanations, hereinafter no distinction is drawn between "Single-Chip" radar systems and distributed radar systems and it goes without saying that the exemplary embodiments described here can be implemented both as single-chip systems and as distributed radar systems.

Figure 4:
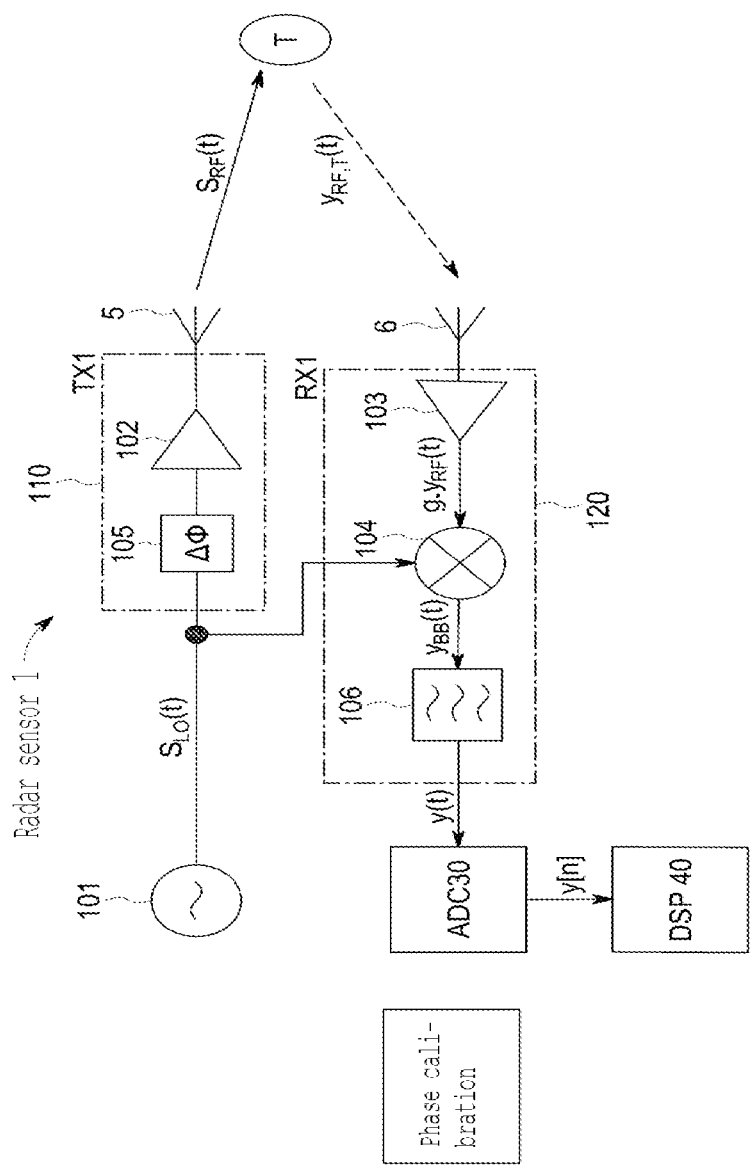
FIG. 4 shows a circuit diagram for illustrating a simplified example of a radar transceiver having a transmitting channel and a receiving channel.

FIG. 4 illustrates one possible implementation of a radar device 1 in accordance with the example from FIG. 3 in greater detail. The present example illustrates in particular the RF frontend 10 of the radar device 1 (cf. FIG. 3). It should be noted that FIG. 4 illustrates a simplified circuit diagram in order to show the fundamental structure of the RF frontend 10 with one transmitting path (Tx path) and one receiving path (Rx path). Actual implementations, which may depend greatly on the specific application, are usually more complex and comprise a plurality of Tx and/or Rx paths. Such systems comprising a plurality of Tx and Rx paths can be operated as MIMO systems.

The RF frontend 10 of the radar device 1 comprises a local oscillator 101 (LO), which generates an RF oscillator signal $s_{LO}(t)$. The LO frequency can be generated with the aid of quartz oscillators and/or VCOs (voltagecontrolled oscillators, which are stabilized by phase locked loops (PLLs)). The RF oscillator signal $s_{LO}(t)$ can be frequency-modulated during operation, as described above with reference to FIG. 2, and is also referred to as LO signal. In radar applications, the LO signal can usually lie in the SHF (Super High Frequency, centimeter-wave) or in the EHF (Extremely High Frequency, millimeter-wave) band, e.g. in the interval of 76 GHz to 81 GHz in some automotive applications. As mentioned, however, exemplary embodiments described here and the application thereof are not restricted to these frequencies. The LO signal $s_{LO}(t)$ can be processed both in a transmitter circuit 110 (in the Tx path) and in a receiver circuit 120 (in the Rx path) of the radar device 1. Transmitter circuit 110 and receiver circuit 120 can together form the RF frontend 10.

The RF transmission signal $s_{RF}(t)$ (cf. FIG. 2), emitted by the Tx antenna 5, can be generated by amplifying the LO signal $s_{LO}(t)$, for example by means of an RF power amplifier 102, and can thus merely be an amplified and possibly phase-shifted version of the LO signal $s_{LO}(t)$. The output of the amplifier 102 can be coupled to the Tx antenna 5 for example via a signal line and/or a solder joint. The RF reception signal $y_{RF}(t)$ received by the Rx antenna 6 can be fed to the receiver circuit in the Rx path via a signal line and/or a solder joint and thus directly or indirectly to the RF port of a mixer 104 of the receiver circuit 120. In the present example, the RF reception signal $y_{RF}(t)$ (antenna signal) is pre-amplified by means of a receiving amplifier 103 (gain g) or the receiver circuit 120. The mixer 104 can thus receive the amplified RF reception signal $gy_{RF}(t)$. The amplifier 103 can be e.g. an LNA. The LO signal $s_{LO}(t)$ is fed to a reference port of the mixer 104, such that the mixer 104 can down-convert the (pre-amplified) RF reception signal $y_{RF}(t)$ to the baseband (or IF band).

The down-converted baseband signal (mixer output signal) is designated below by $y_{BB}(t)$. Said baseband signal $y_{BB}(t)$ can firstly be processed further in analog fashion, wherein the analog baseband signal processing chain substantially brings about further amplification and (e.g. bandpass or low-pass) filtering 106 in order to suppress undesired sidebands and image frequencies. The resulting analog output signal of the Rx path, which is fed to an analog-to-digital converter (see FIG. 3, ADC 30), is designated by y(t). Methods for the digital further processing of the digitized baseband output signal (digital radar signal y[n]) are known per se (for example Range Doppler analysis) and therefore will not be discussed in further detail here.

In the present example, the mixer 104 down-converts the pre-amplified RF reception signal $g\,y_{RF}(t)$ (i.e. the amplified antenna signal) to the baseband in order to obtain a down-converted reception signal $y_{BB}(t)$. The mixing can take place in one stage (that is to say from the RF band directly to the baseband) or via one or more intermediate stages (that is to say from the RF band to an intermediate frequency band and further to the baseband). In this case, the reception mixer 104 can effectively comprise a plurality of individual mixer stages connected in series. The mixer 104 can be implemented in various ways. In some exemplary embodiments, an IQ demodulator (in-phase/quadrature-phase demodulator) can be used as the mixer 104, which has the consequence that the (digital) baseband signal y[n] is a complex-valued signal. Normal mixers that yield a real baseband signal y[n] can be used in other exemplary embodiments. The concepts described here are applicable to both variants.

In the case of radar systems comprising a plurality of Tx paths and a plurality of Rx paths (so-called Multi-Input/Multi-Output (MIMO) systems), it is important for the phases of radar signals emitted via different Tx paths to correspond in each case to a specified value. As mentioned in the introduction, a virtual antenna array comprising a plurality of virtual receiving antennas/channels can be formed in a MIMO radar system. For this purpose, it may be necessary that, in particular, the relative phases (i.e. the respective phase differences) of the radar signals emitted via different Tx paths have defined values. However, the phase shift ΔΦ caused by a Tx path is dependent on unavoidable tolerances during production and additionally has cross-sensitivities, e.g. in relation to temperature. Furthermore, aging effects can alter the phase over the course of time. For this reason, modern radar systems comprise circuit components that allow a setting of the phases of the radar signals emitted via the different Tx paths. For this purpose, the Tx paths can have phase shifters (cf. FIG. 4, phase shifter 105). Said phase shifters can bring about a settable (additional) phase shift $\Delta\phi$ which contributes to the total phase shift $\Delta\Phi$ caused in the respective Tx path.

FMCW radar finds application in situations in which a high accuracy of the distance measurement is required, such as e.g. in the automotive industry. However, the use of FMCW radar systems is often restricted to applications with a short range. For example, typical automotive applications are principally focused on the close-range scenario. The reason for this is crosstalk between Tx antennas 5 and Rx antennas 6, which is inherent to any CW radar (CW, Continuous Wave). Said crosstalk can result in problems for the receiver circuit 120 by virtue of the fact that the latter drives the low noise receiving amplifier 103 to saturation or adversely affects the radar power as a result of reduction of the dynamic range, depending on the magnitude of the crosstalk and the location of the crosstalk. In the case of a radar system having a common Tx and Rx antenna, a large portion of the crosstalk originates from inadequate isolation between circulator terminals connecting transmitter and receiver. In the case of a radar system having separate Tx antennas 5 and Rx antennas 6, the majority of the leakage originates from the free space coupling between the Tx antennas 5 and Rx antennas 6 where up to 40-50 dB isolation can be achieved.

Figure 5:
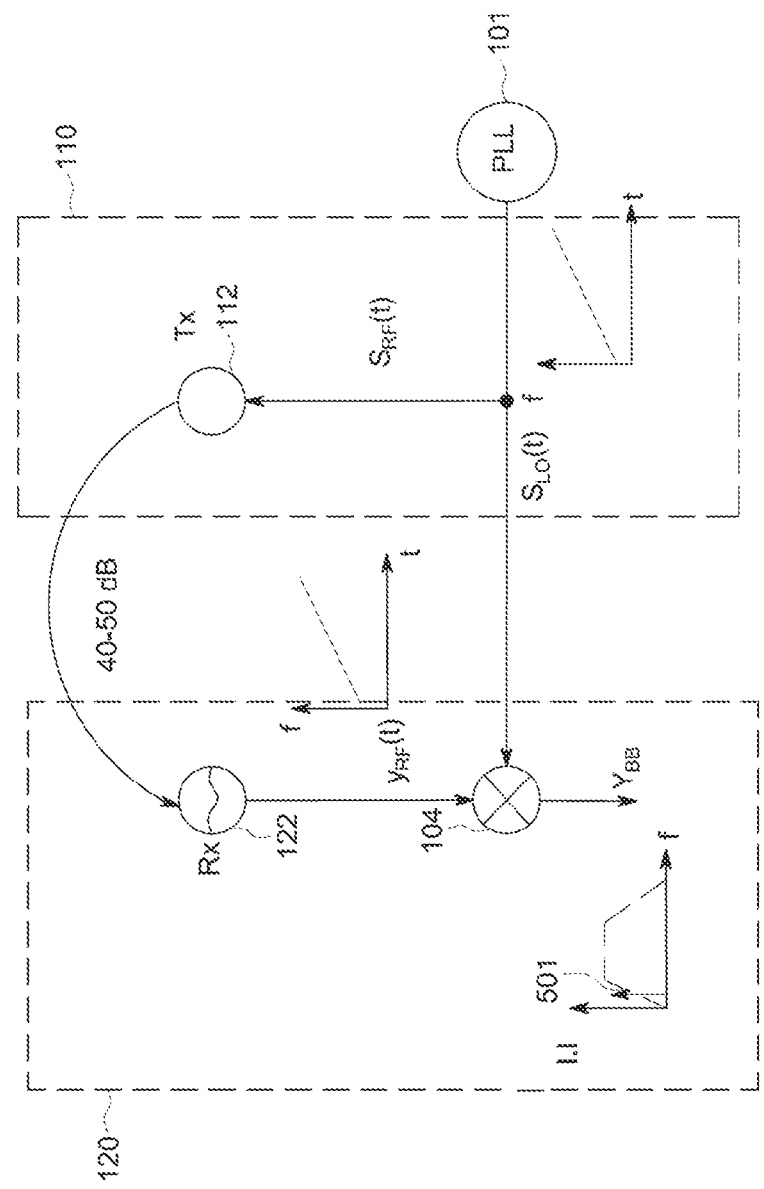
FIG. 5 shows an illustration of crosstalk between transmitting and receiving paths of a radar device.

The phenomenon of crosstalk between Tx and Rx paths is explained with reference to the schematic illustration in FIG. 5.

The RF transmission signal $s_{RF}(t)$ undergoes crosstalk from the Tx antenna 5 to the Rx antenna 6, in the process passes through both a Tx solder ball 112 (connection between Tx circuit 110 and Tx antenna 5) and an Rx solder ball 122 (connection between Rx circuit 1210 and Rx antenna 6) and is mixed with the original local oscillator (LO) signal $s_{LO}(t)$ by means of the mixer 104 in the receiver circuit 120. At the output of the mixer 104 this can result in a baseband or IF signal $y_{BB}(t)$ close to DC (peak 501 in the bottom left corner in FIG. 5), which signal is modified according to a hardware fault (for example in the case of a ball break of the Tx solder ball 112 and/or of the Rx solder ball 122).

The present invention proposes, then, detecting hardware faults of the radar device 1, such as conduction defects or ball breaks, for example, based on a phase of the reception signal $y_{BB}(t)$ down-converted by means of the mixer 104. For this purpose, the transmitter circuit (Tx circuit) 110 and the reception-side computing unit (DSP) 40 can be correspondingly adapted.

Figure 6:
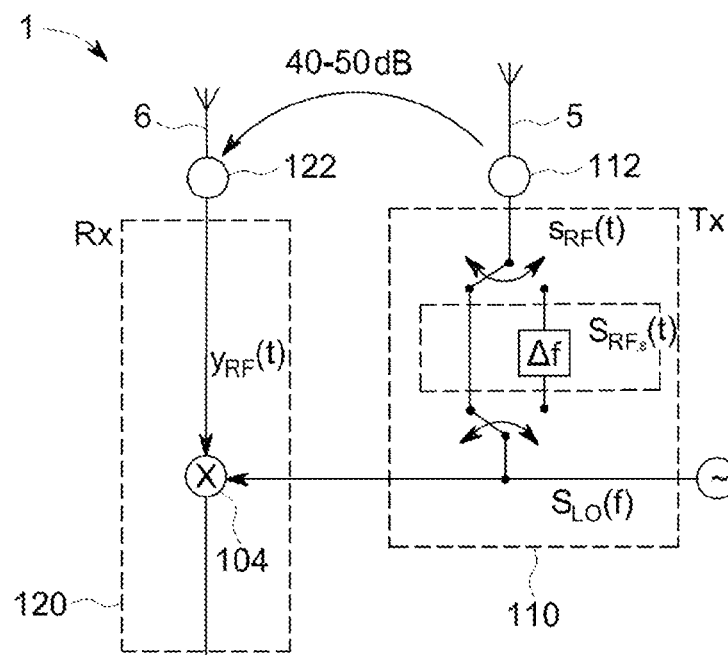
FIG. 6 shows a schematic illustration of a radar device with hardware fault detection in accordance with one exemplary embodiment.
Figure 6:
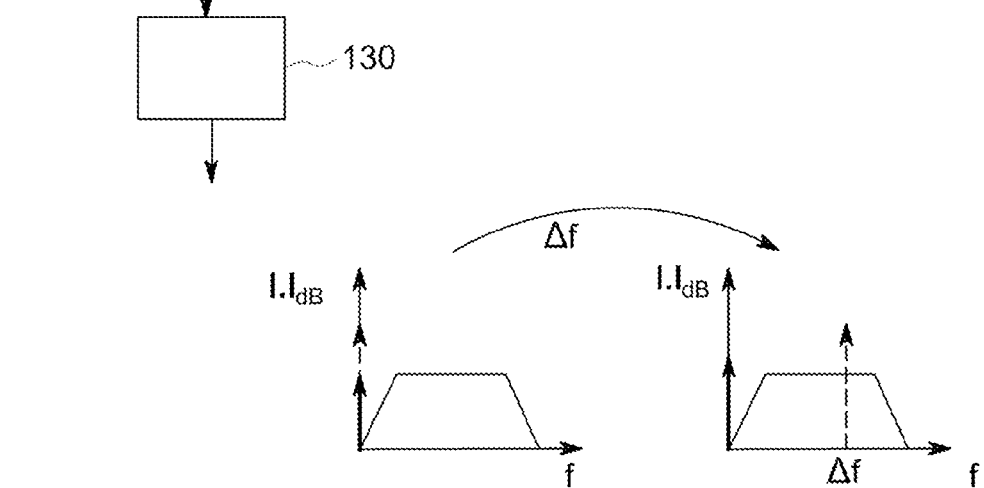

FIG. 6 shows a radar device 1 in accordance with one exemplary embodiment of the present disclosure.

The radar device 1 comprises a Tx circuit 110 configured to generate an RF oscillator signal $s_{LO}(t)$ and to transmit an RF fault detection signal $s_{RF,e}(t)$ based on the RF oscillator signal $s_{LO}(t)$ during a hardware fault detection mode. It is possible, by means of one or more switches, for example, to switch back and forth between the hardware fault detection mode and a "normal mode", in which a radar target acquisition is effected by means of the RF oscillator signal $s_{LO}(t)$, for example if the RF fault detection signal $s_{RF,e}(t)$ deviates from the RF oscillator signal $s_{LO}(t)$. The latter may (but need not) be the case depending on the embodiment. The radar device 1 furthermore comprises an Rx circuit 120 configured to receive an Rx reception signal $y_{RF}(t)$ based on the transmitted RF fault detection signal $s_{RF,e}(t)$ and to mix the RF reception signal $y_{RF}(t)$ with the RF oscillator signal $s_{LO}(t)$ in order to obtain a down-converted reception signal (Rx signal) $y_{BB}(t)$. The radar device 1 furthermore comprises a fault detection circuit 130 configured to detect a hardware fault of the radar device 1 based on a phase or phase change of the down-converted Rx signal $y_{BB}(t)$. The fault detection circuit 130 can be implemented for example in the computing unit 40 (see FIG. 3).

The hardware fault can be, in particular, ball breaks in the Tx and/or Rx path of the radar device 1. That can be the case both for radar circuits constructed in discrete fashion and for radar MMICs soldered onto printed circuit boards by means of solder connections. One or a plurality of Tx terminals of a radar MMIC can be coupled to one or a plurality of terminals of Tx antennas 5 via corresponding solder joints or solder balls 112. Correspondingly, one or a plurality of Rx terminals of a radar MMIC can be coupled to one or a plurality of terminals of Rx antennas 6 via corresponding solder joints or solder balls 122. Tx signals thus pass from the MMIC solder joints 112 corresponding to the Tx antennas. Equally, Rx signals pass from the Rx antennas 6 to solder joints 112 corresponding to the MMIC. Exemplary embodiments allow the detection of faulty solder joints in Tx and/or Rx paths. The detection of other conduction defects which influence a phase difference between RF fault detection signal $s_{RF,e}(t)$ and RF reception signal $y_{RF}(t)$ is likewise conceivable.

As a result of the crosstalk between Tx antennas 5 and Rx antennas 6 as described further above, the RF fault detection signal $s_{RF,e}(t)$ undergoes crosstalk from the Tx antenna 5 to the Rx antenna 6 (with for example 40-50 dB damping) and becomes the down-converted Rx signal $y_{BB}(t)$ via the mixer 104. Faulty solder joints 112, 122 in Tx and/or Rx paths are translated into phase errors between RF fault detection signal $s_{RF,e}(t)$ and RF reception signal $y_{RF}(t)$, which can be detected based on the phase of the down-converted Rx signal $y_{BB}(t)$.

In accordance with exemplary embodiments, the RF fault detection signal $s_{RF,e}(t)$ can be transmitted in a predetermined hardware fault detection mode of the radar device 1. Depending on the radar technology used, in some exemplary embodiments, the RF fault detection signal $s_{RF,e}(t)$ can be the RF oscillator signal $s_{LO}(t)$ itself. This can be the case for example if the radar device 1 is a non-frequency-modulated CW radar device and the RF oscillator signal $s_{LO}(t)$ is used as RF fault detection signal $s_{RF,e}(t)$ in a specific hardware fault detection mode. This could be the case for example if a test for hardware faults is undertaken by the manufacturer prior to delivery of the radar device 1, for example, which test is then evaluated based on the phase of the down-converted reception signal $y_{BB}(t)$.

The DC level of the down-converted Rx signal $y_{BB}(t)$ is often not just influenced by the crosstalk between Tx antennas 5 and Rx antennas 6. Nonlinearities of a plurality of components of the Rx circuit 120, e.g. of the mixer 104 or of the low noise amplifier (LNA) 103 can contribute to the DC level. Moreover, the high-pass or bandpass filter 106 of the mixer 104 suppresses low-frequency components of the down-converted Rx signal $y_{BB}(t)$. Therefore, under certain circumstances, not all radar technologies and/or radar devices enable a simple implementation of the above-described concept of reliable hardware fault detection.

In accordance with some exemplary embodiments, the RF fault detection signal $s_{RF,e}(t)$ is different than the RF oscillator signal $s_{LO}(t)$, however, and so the Tx signal $s_{RF}(t)$ in the hardware fault detection mode is a different signal than that outside the hardware fault detection mode. By way of example for an FMCW radar device—described in the introduction—in which the Tx circuit 110 is configured to generate the RF oscillator signal $s_{LO}(t)$ as an FMCW signal, it can be advantageous to generate the RF fault detection signal $s_{RF,e}(t)$ with a predetermined frequency offset $\Delta f$ with respect to the RF oscillator signal $s_{LO}(t)$ during a hardware fault detection mode, i.e. $s_{RF,e}(t)=s_{LO}(t, f_0+\Delta f)$, wherein—in the case of an FMCW signal—for example $s_{LO}(t, f_0)=\cos(2\pi f_0 t+\pi k t^2)$ where $f_0$ denotes the start frequency or carrier frequency of the FMCW signal and k denotes the gradient of the frequency ramp. The RF fault detection signal $s_{RF,e}(t)$ thus has a frequency shifted by $\Delta f$ in relation to the RF oscillator signal. The hardware fault detection rate can be employed here even during ongoing operation of the FMCW radar device. The Tx circuit 110 can thus be configured to generate the RF fault detection signal $s_{RF,e}(t)$ with a frequency offset $\Delta f$ with respect to the RF oscillator signal $s_{LO}(t)$ during a hardware fault detection mode. The frequency offset $\Delta f$ during the hardware fault detection mode can be achieved for example by means of a modified open-loop/closed-loop control of a PLL.

The frequency offset $\Delta f$ of the RF fault detection signal $s_{RF,e}(t)$ in relation to the RF oscillator signal $s_{LO}(t)$ results in a frequency shift of the entire baseband or IF spectrum of the down-converted Rx signal $y_{BB}(t)$. The frequency offset $\Delta f$ can be chosen according to a passband of the high-pass or bandpass filter 106 of the Rx circuit 120. In other words, the frequency offset $\Delta f$ can lie within a passband of the high-pass or bandpass filter 106, i.e. above lower cutoff frequencies or below upper cutoff frequencies of the Rx filter 106. Depending on the implementation of the Rx circuit 120, the frequency offset $\Delta f$ can lie in a range of 100 kHz to 50 MHz, for example. As a side effect of that, during the hardware fault detection mode, the spectrum of the down-converted Rx signal $y_{BB}(t)$ may become partially free of radar targets since the latter are then cut off by the filter 106. Consequently, the frequency offset $\Delta f$ can also be advantageous for other monitoring concepts besides BB detection.

As a result of the frequency offset $\Delta f$, the down-converted Rx signal $y_{BB}(t)$ originating from the RF fault detection signal undergoing crosstalk appears in the passband of the receiver circuit 120 during the hardware fault detection mode. It can therefore be detected without the damping of the bandpass filter 106. The abovementioned signal artefacts caused by nonlinearities of the circuit components are still at DC. Their influence on the hardware fault detection can therefore be eliminated. Since the applied frequency offset $\Delta f$ for the RF fault detection signal $s_{RF,e}(t)$ is known, the discrete spectral component (in the case of $\Delta f$) of the down-converted Rx signal $y_{BB}(t)$ that corresponds to the RF fault detection signal is also known. Consequently, the phase of this signal component of the down-converted Rx signal that corresponds to the frequency offset can be determined by a DFT, FFT or by a computationally efficient Goertzel filter and can optionally be stored for a comparison with preceding and/or succeeding signals.

In accordance with some exemplary embodiments, the hardware fault detection mode can comprise a plurality of fault detection timeslots and the Tx circuit 110 can be configured to transmit the RF fault detection signal $s_{RF,e}(t)$ during predetermined fault detection timeslots. The RF fault detection signal $s_{RF,e}(t)$ then undergoes crosstalk to one or a plurality of Rx antennas during the fault detection timeslots. Initially, in a system state free of hardware faults, for example, the hardware fault detection can be initiated by applying the frequency offset $\Delta f$ to the RF oscillator signal $s_{LO}(t)$. A radar measurement of targets is not readily possible, however, with the frequency offset $\Delta f$. Therefore, it is possible to effect the hardware fault detection by means of the RF fault detection signal $s_{RF,e}(t)$ in dedicated fault detection timeslots and the Tx circuit 110 can be configured to transmit the RF oscillator signal $s_{LO}(t)$ (without a frequency offset $\Delta f$) outside the fault detection timeslots for target detection.

After the reception signal $y_{RF}(t)$ of a fault detection timeslot has been mixed with the RF oscillator signal $s_{LO}(t)$, the phase of the resulting down-converted Rx signal $y_{BB}(t)$ can be evaluated and stored. Upon the next start or fault detection timeslot of the hardware fault detection, all the steps mentioned above can be repeated, but a currently calculated phase of the down-converted Rx signal $y_{BB}(t)$ of the current fault detection timeslot is compared with that stored previously (previous fault detection timeslot). If a difference between these phases exceeds a predefined threshold value, a hardware fault (e.g. ball break) can be detected. The fault detection circuit 130 can thus be configured to detect the hardware fault based on a comparison of the phases of the down-converted Rx signals of two successive fault detection timeslots. For this purpose, the radar device 1 can also comprise a memory in order to store a phase value of the down-converted Rx signal of at least one fault detection timeslot.

The concept which is proposed here and makes use of Tx-Rx crosstalk is not just applicable to the SISO case described above. In the case of a MISO (Multiple Input Single Output) set-up a plurality of Tx antennas and one Rx antenna are used. This gives rise for example to the following possible implementations of the proposed hardware fault detection.

In accordance with one possible implementation, one dedicated Tx antenna can be used for detecting a hardware fault (e.g. ball break) of the radar device 1. For this purpose, one dedicated Tx path can transmit the RF fault detection signal $s_{RF,e}(t)$ with a frequency offset $\Delta f$ during predetermined fault detection timeslots and all the other Tx paths can be inhibited (i.e. do not transmit) during the fault detection timeslots. By evaluating the phase(s) of the resulting down-converted Rx signal $y_{BB}(t)$ analogously to the SISO case described above, it is possible to detect a hardware fault in the dedicated Tx-Rx path used. Hardware faults (e.g. ball breaks) in the unused Tx paths are not readily detectable, however, in this way.

An alternative implementation consists in simultaneously activating all the Tx antennas or Tx paths during predetermined fault detection timeslots in order to transmit a respective RF fault detection signal. For this purpose, the frequency offset $\Delta f$ can be applied to all the Tx antennas. This can be done by adding the frequency offset $\Delta f$ to the LO signal $s_{LO}(t)$ before the resulting respective RF fault detection signal is distributed to the various Tx antennas. Consequently, no additional hardware in comparison with the SISO case is required. As in the SISO case, the use of all Tx antennas at once makes it possible to detect hardware faults both in the Tx path and in the Rx path. However, this implementation does not readily allow differentiation between Tx and Rx hardware faults. If this is desired, different frequency offsets can be applied to different Tx antennas, although this increases the hardware outlay. The phases of the down-converted Rx signal that are associated with the different frequency offsets can then be evaluated on the reception side for the purpose of ascertaining faults. Different frequency offsets in different Tx channels can also be used for the following exemplary embodiments (difference phase for MISO/MIMO). As a result, sequential switching on of the Tx antennas can be avoided in these cases as well.

In accordance with a further alternative implementation, respective RF fault detection signals can be transmitted sequentially (i.e. by way of time division multiplexing) via different Tx paths. By way of example, within a fault detection timeslot, respective RF fault detection signals can be transmitted sequentially (by way of time division multiplexing) via all the Tx paths. In a first fault detection timeslot, the phase of the respectively down-converted Rx signal $y_{BB}(t)$ for each separately active Tx antenna can be evaluated and stored. The repetition of this process in all following fault detection timeslots and the comparison of the respectively calculated phases with those respectively stored previously make it possible firstly to detect an Rx hardware fault (e.g. if all the phases are different) or to detect a Tx hardware fault (if only the phase of a specific Tx path has changed). In the case of this implementation, the frequency offset of can be applied to all the Tx paths. This does not require additional hardware.

Sequential driving of the Tx paths for fault detection can entail a further advantage with regard to the robustness of the hardware fault detection. It can be shown that the phase of a down-converted Rx signal $y_{BB}(t)$ is dependent not only on possible ball breaks but also on fluctuations of the supply voltage, aging effects or temperature effects. Therefore, the comparison of solely the absolute phase values with values stored previously, result in incorrectly identifying ball breaks. In order to avoid this problem, the evaluation of relative phases between different Tx-Rx paths is proposed in this case. However, the relative phase calculation is possible only for sequentially active Tx paths. Different frequency offsets in different Tx channels are however possible here as well.

Figure 7:
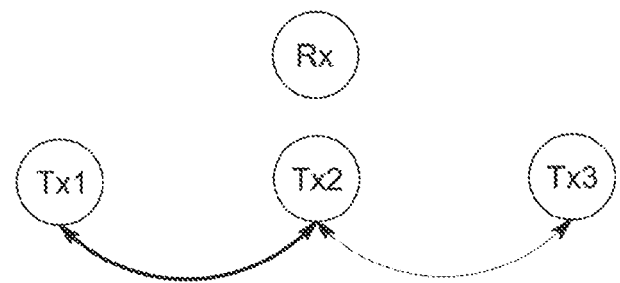
FIG. 7 shows ball break detection in the MISO case.

If a radar set-up having three Tx antennas and one Rx antenna is considered, as shown in FIG. 7, the phases of each down-converted Rx signal $y_{BB}(t)$, which corresponds to a specific Tx-Rx path, can be expressed as $$\Phi_{Tx1Rx} = \Phi_0 + \Phi_{temp} + \Phi_{Tx1,BB} + \Phi_{Rx,BB}$$

$$\Phi_{Tx2Rx} = \Phi_0 + \Phi_{temp} + \Phi_{Rx,BB}$$

$$\Phi_{Tx3Rx} = \Phi_0 + \Phi_{temp} + \Phi_{Rx,BB},$$

where $\Phi_0$ denotes the initial phase, $\Phi_{temp}$ denotes the phase drift on account of temperature effects, $\Phi_{Tx1,BB}$ denotes the phase shift of a defective first Tx solder ball, and $\Phi_{Rx,BB}$ a phase shift induced by a defective Rx solder ball. As already mentioned, there are various reasons for phase shifts. Nevertheless, temperature is the most important reason; therefore, only temperature effects are taken into account in the above equation.

In this regard, for example, a difference between the phases of the down-converted Rx signal of the first Rx path (Rx1) and of the fourth Rx path (Rx4) can be stored and compared with the preceding or succeeding fault detection timeslot. A difference between the phases of the down-converted Rx signals of the second Rx path (Rx2) and of the third Rx path (Rx3) can likewise be stored and compared with the preceding or succeeding fault detection timeslot. A difference between the phases of the down-converted Rx signals of the third Rx path (Rx3) and of the fourth Rx path (Rx4) can likewise be stored and compared with the preceding or succeeding fault detection timeslot. The calculation of an arbitrary difference ($\Phi_{Tx1Rx} - \Phi_{Tx2Rx}$, $\Phi_{Tx2Rx} - \Phi_{Tx3Rx}$, $\Phi_{Tx1Rx} - \Phi_{Tx3Rx}$) between these phases (identified by the different arrows in FIG. 7) naturally mitigates the temperature effects, but also omits a reliable detection of a defective Rx solder ball. As a consequence, a more robust detection of defective Rx solder balls is possible only for a radar set-up having a plurality of Rx antennas.

In a MISO set-up, the transmitter circuit 110 thus comprises a first and at least one second transmitting path and is configured to transmit a respective RF fault detection signal based on the RF oscillator signal $s_{LO}(t)$ via one or a plurality of the transmitting paths during predetermined fault detection timeslots. The same frequency offset of can always be applied in this case. The receiver circuit 120 is configured to receive the respective RF fault detection signal of the active Tx path during the fault detection timeslots and to mix it with the RF oscillator signal $s_{LO}(t)$ in order to obtain a respective down-converted Rx signal associated with the active Tx path. The fault detection circuit 130 is configured to detect the hardware fault based on a phase of a signal component of the respective down-converted Rx signal that corresponds to the respective RF fault detection signal.

This can be effected in each case as outlined for the SISO case. The transmitter circuit 110 can thus be configured to transmit a first RF fault detection signal via the first transmitting path Tx1 during a first fault detection timeslot and to transmit a second RF fault detection signal via the second transmitting path Tx2 during a second fault detection timeslot following the first fault detection timeslot (time division multiplexing). The receiver circuit 120 can be configured to receive the first RF fault detection signal during the first fault detection timeslot and to mix with the RF oscillator signal $s_{LO}(t)$ in order to obtain a first down-converted Rx signal $y_{BB,1}(t)$, and to receive the second RF fault detection signal during the second fault detection timeslot and to mix it with the RF oscillator signal $s_{LO}(t)$ in order to obtain a second down-converted Rx signal $y_{BB,2}(t)$. The fault detection circuit 130 can be configured to determine a first phase of a signal component of the first down-converted Rx signal that corresponds to the first RF fault detection signal during the first fault detection timeslot, to determine a second phase of a signal component of the second down-converted Rx signal that corresponds to the second RF fault detection signal during the second fault detection timeslot, and to determine the hardware fault based on the first and second phases. For this purpose, the first and second phases can respectively be compared with stored first and second phases of preceding first and second fault detection timeslots.

The transmitter circuit 110 can thus be configured to transmit a first RF fault detection signal via the first transmitting path Tx1 during a first fault detection timeslot and to transmit a second RF fault detection signal via the second transmitting path Tx2 during a second fault detection timeslot following the first fault detection timeslot (time division multiplexing). The receiver circuit 120 can be configured to receive the first RF fault detection signal during the first fault detection timeslot and to mix it with the RF oscillator signal $s_{LO}(t)$ in order to obtain a first down-converted Rx signal $y_{BB,1}(t)$, and to receive the second RF fault detection signal during the second fault detection timeslot and to mix it with the RF oscillator signal $s_{LO}(t)$ in order to obtain a second down-converted Rx signal $y_{BB,2}(t)$. The fault detection circuit 130 can be configured to determine a first phase of a signal component of the first down-converted Rx signal that corresponds to the first RF fault detection signal during the first fault detection timeslot, to determine a second phase of a signal component of the second down-converted Rx signal that corresponds to the second RF fault detection signal during the second fault detection timeslot, and to determine the hardware fault based on the first and second phases. For this purpose, the first and second phases can respectively be compared with stored first and second phases of preceding first and second fault detection timeslots. Alternatively, in successive fault detection timeslots, arbitrary differences ($\Phi_{Tx1Rx}-\Phi_{Tx2Rx}$, $\Phi_{Tx2Rx}-\Phi_{Tx3Rx}$, $\Phi_{Tx1Rx}-\Phi_{Tx3Rx}$) between these phases can be formed and compared with respective differences ($\Phi_{Tx1Rx}-\Phi_{Tx2Rx}$, $\Phi_{Tx2Rx}-\Phi_{Tx3Rx}$, $\Phi_{Tx1Rx}-\Phi_{Tx3Rx}$) from preceding and/or succeeding fault detection timeslots. If a deviation is too large, a ball break can be detected. In this regard, for example, a difference between the phases of the down-converted Rx signals of the first Tx path ($\Phi_{Tx1Rx}$) and of the third Tx path ($\Phi_{Tx3Rx}$) can be stored and compared with the preceding or succeeding fault detection timeslot. A difference between the phases of the down-converted Rx signals of the second Tx path ($\Phi_{Tx2Rx}$) and of the third Rx path ($\Phi_{Tx3Rx}$) can likewise be stored and compared with the preceding or succeeding fault detection timeslot. A difference between the phases of the down-converted Rx signals of the first Tx path ($\Phi_{Tx1Rx}$) and of the second Tx path ($\Phi_{Tx2Rx}$) can likewise be stored and compared with a phase difference of the preceding or succeeding fault detection timeslot.

In the SIMO case, a single Tx antenna and a plurality of Rx antennas can be used. By evaluating the phases of the down-converted Rx signals caused by the Tx-Rx crosstalk into all the Rx antennas, it is possible to implement the proposed hardware fault detection analogously to the SISO case. Nevertheless, additional information of a plurality of Rx antennas can be used for extending the hardware fault detection.

Figure 8:
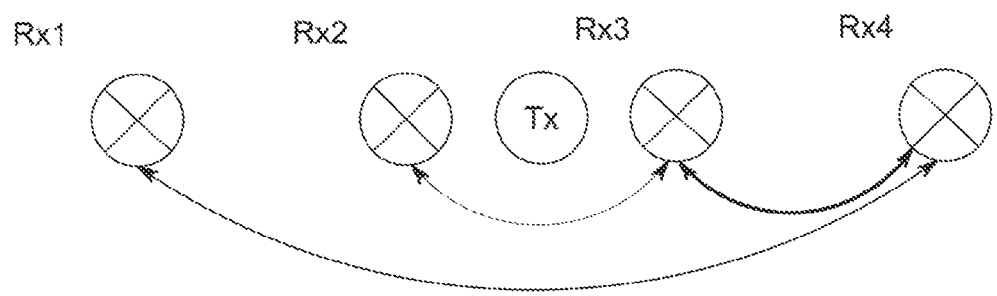
FIG. 8 shows ball break detection in the SIMO case.

As already mentioned, besides the phase shift induced by ball breaks, the phase of the down-converted Rx signal can also be influenced by changes in the supply voltage, aging effects or temperature effects. These effects can thus result in incorrectly detected ball breaks if exclusively an absolute phase of a down-converted Rx signal is used for detection purposes. Here, too, only temperature effects are considered below. In a manner similar to that in the MISO case, the extension of the hardware fault detection is based on the phase difference between different Rx paths. FIG. 8 illustrates the schematic set-up of a radar sensor having one Tx antenna and four Rx antennas.

In each Rx path Rx1-Rx4 it is possible to calculate the phase of the respectively down-converted Rx signal relative to the RF fault detection signal respectively undergoing crosstalk from Tx. Instead of absolute values being stored, differences between specific Rx paths (as indicated by the arrows in FIG. 8) can be stored for comparison purposes. In this regard, for example, a difference between the phases of the down-converted Rx signals of the first Rx path (Rx1) and of the fourth Rx path (Rx4) can be stored and compared with the preceding or succeeding fault detection timeslot. A difference between the phases of the down-converted Rx signals of the second Rx path (Rx2) and of the third Rx path (Rx3) can likewise be stored and compared with the preceding or succeeding fault detection timeslot. A difference between the phases of the down-converted Rx signals of the third Rx path (Rx3) and of the fourth Rx path (Rx4) can likewise be stored and compared with the preceding or succeeding fault detection timeslot.

If, between two successive fault detection timeslots, a difference between the phases of the down-converted Rx signals of two different Rx paths varies by more than a predefined value, a ball break that occurred between the fault detection timeslots can be detected.

|  | No BB. | Rx1 5 deg |
|---|---|---|
| Rx1-Rx4 | 54.750 | 49.75 |
| Rx2-Rx3 | −1.238 | −1.238 |
| Rx3-Rx4 | 183.811 | 183.81 |

In the example illustrated here, for example, a ball break in Rx1 can be detected because the difference between the phases of the down-converted Rx signals of the first Rx path (Rx1) and of the fourth Rx path (Rx4) in two successive fault detection timeslots varies by 5°. Ideally, the difference Rx1-Rx4 in two successive fault detection timeslots would not vary.

The approach described can mitigate the temperature dependence of the ball break detection since the different Rx antennas are expected to behave similarly in the case of temperature changes. It should be mentioned that the more temperature-robust hardware fault detection only allows the detection of Rx ball breaks. This can be explained if the signal phases of the down-converted Rx signals of all the Rx paths is formulated as $$\Phi_{Rx,1}=\Phi_0+\Phi_{temp}+\Phi_{Tx1,BB}+\Phi_{Rx1,BB}$$

$$\Phi_{Rx,2}=\Phi_0+\Phi_{temp}+\Phi_{Tx,BB}$$

$$\Phi_{Rx,3}=\Phi_0+\Phi_{temp}+\Phi_{Tx,BB}$$

$$\Phi_{Rx,4}=\Phi_0+\Phi_{temp}+\Phi_{Tx,BB},$$

where $\Phi_0$ denotes the initial phase, $\Phi_{temp}$ denotes the phase deviation on account of temperature effects, $\Phi_{Tx,BB}$ denotes the phase shift on account of a Tx ball break, and $\Phi_{Rx1,BB}$ denotes a phase shift induced by a ball break in the first Rx path. Clearly the calculation of the difference between the signal phases of the down-converted Rx signals eliminates the temperature effects, but also the influence of a Tx ball break. This disadvantage can be eliminated if the radar set-up contains a plurality of Tx antennas, as for MISO or the MIMO case.

For SIMO and MIMO cases, the Rx circuit 120 can thus comprise a first and at least one second Rx path and is configured to receive a respective RF fault detection signal based on the RF oscillator signal $s_{LO}(t)$ via one or a plurality of the Rx paths during predetermined fault detection timeslots and to mix it with the RF oscillator signal $s_{LO}(t)$ in order to obtain a respective down-converted Rx signal. The fault detection circuit 130 can be configured to detect the hardware fault (e.g. defective solder ball) based on a phase of a signal component of the respective down-converted reception signal that corresponds to the RF fault detection signal. As has already been described above, the RF fault detection signal can be generated with a predetermined frequency offset of with respect to the RF oscillator signal $s_{LO}(t)$. Hardware faults, for example in the form of a ball break or some other conduction defect, of the different receiving paths or of the transmitting path can thus be detected.

The Rx circuit 120 can be configured to receive an RF fault detection signal from a Tx path via the first Rx path during a fault detection timeslot and to receive the RF fault detection signal from the Tx path via the Rx path during the fault detection timeslot. The fault detection circuit 130 can be configured to determine a first phase of a signal component of the down-converted Rx signal that corresponds to the first Rx path during the fault detection timeslot, to determine a second phase of a signal component of the down-converted Rx signal that corresponds to the second Rx path during the fault detection timeslot, and to determine the hardware fault based on the first and second phases. By way of example, the fault detection circuit 130 can be configured to detect the hardware fault based on a comparison of the first phases of the down-converted Rx signals of two successive first fault detection timeslots of the first Rx path and/or to detect the hardware fault based on a comparison of the second phases of the down-converted Rx signals of two successive second fault detection timeslots of the second Rx path. A difference between the phases of the down-converted Rx signals of the first Rx path (Rx1) and of the second Rx path (Rx2) can likewise be stored and compared with differences of the preceding or succeeding fault detection timeslot.

The described insights for the MISO and SIMO cases should be combined in order to cover MIMO radar systems. The combination of the abovementioned ball break detections that include phase differences thus makes possible a robust detection both of defective Tx solder balls and of defective Rx solder balls. If a MIMO radar having three Tx antennas and four Rx antennas is considered, all the Tx antennas can be activated sequentially, as described for the MISO case. The corresponding phases of the down-converted Rx signals for all the Rx paths are calculated, which results in a total number of 12 phase values (four Rx antennas). The phase of the down-converted Rx signals caused by the crosstalk can be designated by $\Phi_{i,j}$, where i=1 . . . 3 denotes a Tx antenna index and j=1 . . . 4 denotes an Rx antenna index. For this exemplary case, a minimum number of five phase differences can be stored in order to uniquely identify a defective solder ball. A possible choice for the phase differences is $\Phi_{1,1} - \Phi_{2,1}$ $\Phi_{2,1} - \Phi_{3,1}$ in order to determine defective Tx solder balls and $\Phi_{1,1} - \Phi_{1,4}$ $\Phi_{1,2} - \Phi_{1,3}$ $\Phi_{1,3} - \Phi_{1,4}$ in order to determine defective Rx solder balls. The actual ball break detection is again based on changes in these stored phase differences between two monitoring timeslots (detailed explanation for the SISO case). Storing and comparing additional phase combinations yields redundant information. However, this redundancy could be used for verifying defective solder balls and requires only little additional hardware (digital memory and digital subtractor).

Different frequency offsets in different Tx channels can also be used for the exemplary embodiments described above (difference phase for MISO/MIMO). As a result, the sequential switching on of the Tx antennas can be avoided in these cases as well.

Figure 9:
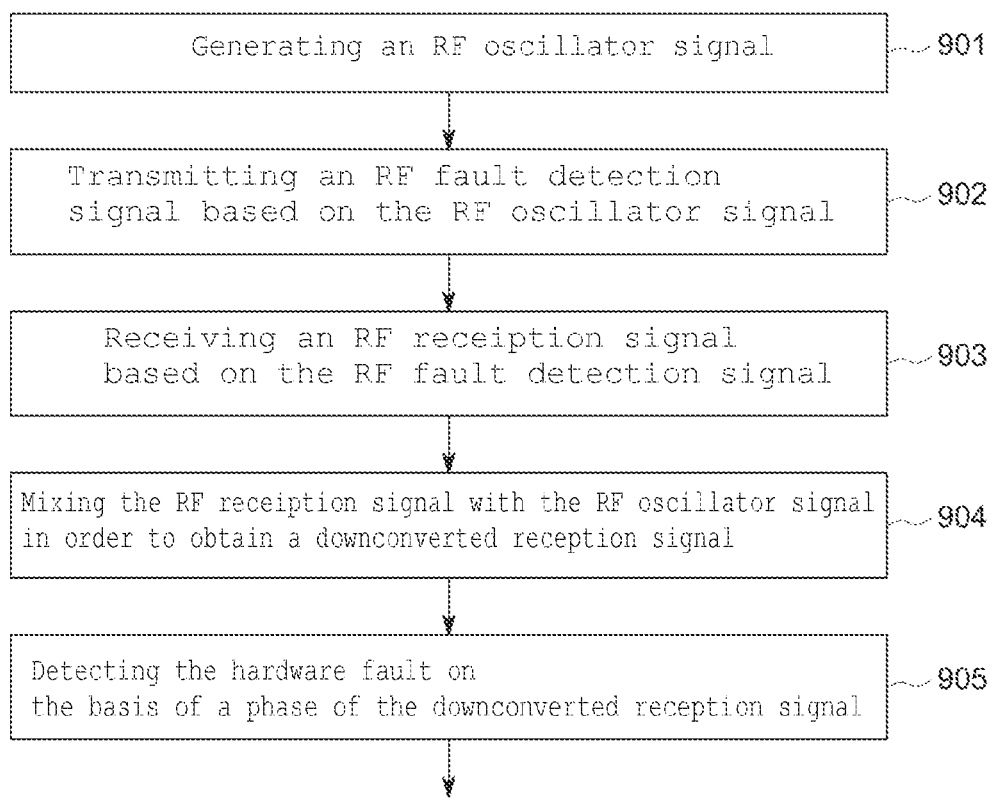
FIG. 9 shows a schematic flow diagram of a method for detecting hardware faults of a radar device.

FIG. 9 schematically shows, in summary, a method 900 for detecting hardware faults (e.g. defective solder balls) of a radar device 1.

The method 900, comprises generating 901 an RF oscillator signal, transmitting 902 an RF fault detection signal $s_{RF,e}(t)$ based on the RF oscillator signal $s_{LO}(t)$, receiving 903 an RF reception signal $y_{RF}(t)$ based on the RF fault detection signal $s_{RF,e}(t)$ (e.g. as a result of crosstalk from Tx to Rx), mixing 904 the RF reception signal $y_{RF}(t)$ with the RF oscillator signal $s_{LO}(t)$ in order to obtain a down-converted reception signal $y_{BB}(t)$ and detecting 905 the hardware fault based on a phase of the down-converted reception signal $y_{BB}(t)$.

In this case, the RF fault detection signal can be transmitted in predetermined fault detection timeslots with a predetermined frequency offset $\Delta f$ with respect to the RF oscillator signal $s_{LO}(t)$, which can be generated as an FMCW signal in some exemplary embodiments. Outside the fault detection timeslots, the RF oscillator signal $s_{LO}(t)$ can be transmitted for the purpose of target acquisition. On the reception side, a discrete spectral component of the down-converted reception signal that corresponds to the frequency offset $\Delta f$ can be determined based on the Goertzel algorithm. The hardware fault can then be detected based on the phase of the discrete spectral component. In particular, the hardware fault can be detected based on a comparison of the phases of the down-converted reception signals of two successive fault detection timeslots.

Exemplary embodiments of the present disclosure make it possible to detect hardware faults, such as defective solder balls, for example, during the life cycle of a radar sensor. Both defective Tx solder balls and Rx solder balls can be detected by means of the concept presented.

The aspects and features that have been described together with one or more of the examples and figures described in detail above can also be combined with one or more of the other examples in order to replace an identical feature of the other example or in order additionally to introduce the feature into the other example.

The description and drawings present only the principles of the disclosure. Furthermore, all examples mentioned here are intended to be used expressly only for illustrative purposes, in principle, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A function block referred to as "means for . . . " implementing a specific function can relate to a circuit configured for implementing a specific function. Consequently, a "means for something" can be implemented as a "means configured for or suitable for something", e.g. a component or a circuit configured for or suitable for the respective task.

A block diagram can represent a rough circuit diagram, for example, which implements the principles of the disclosure. In a similar manner, a flow diagram, a flow chart, a state transition diagram, a pseudo-code and the like can represent various processes, operations or steps which for example are substantially represented in a computer-readable medium and thus executed by a computer or processor, regardless of whether such a computer or processor is explicitly shown. Methods disclosed in the description or in the patent claims can be implemented by a component which has a means for carrying out each of the respective steps of these methods.

It goes without saying that the disclosure of a plurality of steps, processes, operations or functions disclosed in the description or in the claims should not be interpreted as being in the specific order, unless this is explicitly or implicitly indicated otherwise, for example for technical reasons. The disclosure of a plurality of steps or functions therefore does not limit them to a specific order unless said steps or functions are not interchangeable for technical reasons. Furthermore, in some examples, an individual step, function, process for operation can include a plurality of partial steps, partial functions, partial processes or partial operations and/or be subdivided into them. Such partial steps can be included and can be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claims with the subject-matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. A radar device, comprising:
    a transmitter circuit configured to generate an RF oscillator signal and to transmit, during a first fault detection timeslot, a first RF fault detection signal derived from the RF oscillator signal and transmit, during a second fault detection timeslot, a second RF fault detection signal derived from the RF oscillator signal, wherein the first RF fault detection signal and the second RF fault detection signal have a predetermined frequency offset with respect to the RF oscillator signal;
    a receiver circuit configured to:
        receive the first RF fault detection signal as a first RF reception signal via antenna crosstalk coupling with the transmitter circuit, and mix the first RF reception signal with the RF oscillator signal in order to obtain a first down-converted reception signal, and
        receive the second RF fault detection signal as a second RF reception signal via antenna crosstalk coupling with the transmitter circuit, and mix the second RF reception signal with the RF oscillator signal in order to obtain a second down-converted reception signal; and
    a fault detection circuit configured to determine a first phase of the first down-converted reception signal, determine a second phase of the second down-converted reception signal, and detect a hardware fault of the radar device based on a difference between the first phase of the first down-converted reception signal and the second phase of the second down-converted reception signal,
        wherein the hardware fault includes at least one RF signal conduction breakage defect in a transmitter signal path of the transmitter circuit or in a receiver signal path of the receiver circuit.

2. The radar device as claimed in claim 1, wherein the fault detection circuit is configured to determine the first phase of the first down-converted reception signal based on a discrete Fourier transformation of the first down-converted reception signal.

3. The radar device as claimed in claim 1, wherein the fault detection circuit is configured to determine a discrete spectral component of the first down-converted reception signal that corresponds to the first RF fault detection signal based on a Goertzel algorithm and to detect the hardware fault based on a phase of the discrete spectral component.

4. The radar device as claimed in claim 1, wherein the transmitter circuit is configured to generate the RF oscillator signal as a frequency-modulated continuous wave radar signal.

5. The radar device as claimed in claim 1, wherein the transmitter circuit is configured to transmit the first RF fault detection signal and the second RF fault detection signal during predetermined fault detection timeslots associated with a fault detection mode.

6. The radar device as claimed in claim 5, wherein the transmitter circuit is configured to transmit the RF oscillator signal as a radar signal for target acquisition outside of the predetermined fault detection timeslots.

7. The radar device as claimed in claim 1, wherein the receiver circuit has a high-pass filter or a bandpass filter, and
    wherein the predetermined frequency offset lies within a passband of the high-pass filter or the bandpass filter.

8. The radar device as claimed in claim 1, wherein the fault detection circuit is configured to:
    determine, as the first phase, a phase of a first spectral component of the first down-converted reception signal, the first spectral component corresponding to the predetermined frequency offset,
    determine, as the second phase, a phase of a second spectral component of the second down-converted reception signal, the second spectral component corresponding to the predetermined frequency offset, and
    determine whether or not the hardware fault is present based on evaluating a comparison value between the phase of the first spectral component and the phase of the second spectral component, including determining that the hardware fault is present based on the comparison value satisfying a threshold value.

9. The radar device as claimed in claim 8, wherein the first fault detection timeslot and the second fault detection timeslot are successive fault detection timeslots.

10. The radar device as claimed in claim 1, wherein the first fault detection timeslot and the second fault detection timeslot are successive fault detection timeslots, and
    wherein the fault detection circuit is configured to detect the hardware fault based on a comparison value between the first phase and the second phase exceeding a predetermined threshold value.

11. The radar device as claimed in claim 1, wherein:
    the transmitter circuit comprises a first transmitting path and a second transmitting path and is configured to transmit the first RF fault detection signal via one the first transmitting path and transmit the second RF fault detection signal via the second transmitting path,
    wherein the receiver circuit is configured to receive the first RF fault detection signal as the first RF reception signal during the first fault detection timeslot, and receive the second RF fault detection signal as the second RF reception signal during the second fault detection timeslot.

12. The radar device as claimed in claim 1, wherein:
    the transmitter circuit is configured to transmit the first RF fault detection signal via a first transmitting path during the first fault detection timeslot and to transmit the second RF fault detection signal via a second transmitting path during the second fault detection timeslot following the first fault detection timeslot,
    the receiver circuit is configured to receive the first RF fault detection signal as the first RF reception signal during the first fault detection timeslot and to mix the first RF fault detection signal with the RF oscillator signal in order to obtain the first down-converted reception signal, and to receive the second RF fault detection signal as the second RF reception signal during the second fault detection timeslot and to mix the second RF fault detection signal with the RF oscillator signal in order to obtain the second down-converted reception signal, and the fault detection circuit is configured to:
during the first fault detection timeslot, determine, as the first phase, a phase of a signal component of the first down-converted reception signal that corresponds to the predetermined frequency offset,
during the second fault detection timeslot, determine, as the second phase, a phase of a signal component of the second down-converted reception signal that corresponds to the predetermined frequency offset, and
detect the hardware fault based on a difference between the first phase and the second phase satisfying a threshold.

13. The radar device as claimed in claim 1, wherein the transmitter circuit has a transmitting antenna and the receiver circuit has a receiving antenna, and wherein the first RF fault detection signal and the second RF fault detection signal undergo crosstalk from the transmitting antenna to the receiving antenna for providing the first RF reception signal and the second RF reception signal to the receiver circuit, respectively.

14. The radar device as claimed in claim 1, wherein the transmitter circuit and the receiver circuit are integrated in a common monolithic microwave integrated circuit (MMIC).

15. The radar device as claimed in claim 1, wherein the RF signal conduction breakage defect is a solder joint defect.

16. The radar device as claimed in claim 1, wherein the transmitter signal path includes:
a first signal path through which the RF oscillator signal is provided to an RF transmit terminal for transmitting the RF oscillator signal as a radar signal;
a second signal path, including a frequency shifter configured to shift the RF oscillator signal by the predetermined frequency offset to generate the first RF fault detection signal and the second RF fault detection signal, and provide the first RF fault detection signal and the second RF fault detection signal to the RF transmit terminal for transmission; and
a switch configured to:
couple, during the first fault detection timeslot, the RF oscillator signal to the RF transmit terminal for providing the first RF fault detection signal to the RF transmit terminal for transmission,
couple, during the second fault detection timeslot, the RF oscillator signal to the RF transmit terminal for providing the second RF fault detection signal to the RF transmit terminal for transmission, and
couple, outside of the first fault detection timeslot and the second fault detection timeslot, the RF oscillator signal to the RF transmit terminal for providing the RF oscillator signal to the RF transmit terminal for transmission.

17. The radar device as claimed in claim 8, wherein the first spectral component and the second spectral component correspond only to the predetermined frequency offset.

18. The radar device as claimed in claim 1, wherein the transmitter circuit is configured to transmit the first RF fault detection signal via a first transmitting path during the first fault detection timeslot and to transmit the second RF fault detection signal via a second transmitting path during the second fault detection timeslot following the first fault detection timeslot,
wherein the transmitter circuit is configured to transmit a third RF fault detection signal via the first transmitting path during a third fault detection timeslot and to transmit a fourth RF fault detection signal via the second transmitting path during a fourth fault detection timeslot following the third fault detection timeslot, wherein the third RF fault detection signal and the fourth RF fault detection signal have the predetermined frequency offset with respect to the RF oscillator signal,
wherein the receiver circuit is configured to:
receive a third RF reception signal associated with the third RF fault detection signal and mix the third RF reception signal with the RF oscillator signal in order to obtain a third down-converted reception signal, and
receive a fourth RF reception signal associated with the fourth RF fault detection signal and mix the fourth RF reception signal with the RF oscillator signal in order to obtain a fourth down-converted reception signal,
wherein the fault detection circuit is configured to:
determine a third phase of the third down-converted reception signal,
determine a fourth phase of the fourth down-converted reception signal,
determine a first difference between the first phase and the second phase,
determine a second difference between the third phase and the fourth phase,
determine a difference between the first difference and the second difference, and
detect the hardware fault based on the difference between the first difference and the second difference satisfying a threshold.

19. The radar device as claimed in claim 1, wherein the transmitter circuit is configured to transmit a third RF fault detection signal during a third fault detection timeslot and to transmit a fourth RF fault detection signal during a fourth fault detection timeslot following the third fault detection timeslot, wherein the third RF fault detection signal and the fourth RF fault detection signal have the predetermined frequency offset with respect to the RF oscillator signal, the first RF fault detection signal, the second RF fault detection signal, the third RF fault detection signal, and the fourth RF fault detection signal being transmitted via a same transmitting path,
wherein the receiver circuit is configured to:
receive the first RF reception signal at a first receiving path,
receive the second RF reception signal at a second receiving path that is different from the first receiving path,
receive the third RF fault detection signal as a third RF reception signal at the first receiving path via antenna crosstalk coupling with the transmitter circuit, and mix the third RF reception signal with the RF oscillator signal in order to obtain a third down-converted reception signal, and
receive the fourth RF fault detection signal as a fourth RF reception signal at the second receiving path via antenna crosstalk coupling with the transmitter circuit, and mix the fourth RF reception signal with the RF oscillator signal in order to obtain a fourth down-converted reception signal, wherein the fault detection circuit is configured to:
determine a third phase of the third down-converted reception signal,
determine a fourth phase of the fourth down-converted reception signal,
determine a first difference between the first phase and the second phase,
determine a second difference between the third phase and the fourth phase,
determine a difference between the first difference and the second difference, and
detect the hardware fault based on the difference between the first difference and the second difference satisfying a threshold.

20. The radar device as claimed in claim 1, wherein the first fault detection timeslot and the second fault detection timeslot are different fault detection timeslots,
wherein the receiver circuit is configured to:
receive the first RF reception signal at a first receiving path,
receive the second RF reception signal at a second receiving path that is different from the first receiving path,
receive the first RF fault detection signal as a third RF reception signal at the second receiving path via antenna crosstalk coupling with the transmitter circuit, and mix the third RF reception signal with the RF oscillator signal in order to obtain a third down-converted reception signal, and
receive the second RF fault detection signal as a fourth RF reception signal at the first receiving path via antenna crosstalk coupling with the transmitter circuit, and mix the fourth RF reception signal with the RF oscillator signal in order to obtain a fourth down-converted reception signal,
wherein the fault detection circuit is configured to:
determine a third phase of the third down-converted reception signal,
determine a fourth phase of the fourth down-converted reception signal,
determine a first difference between the first phase and the third phase,
determine a second difference between the second phase and the fourth phase,
determine a difference between the first difference and the second difference, and
detect the hardware fault based on the difference between the first difference and the second difference satisfying a threshold.

21. A method for detecting hardware faults of a radar device, comprising:
generating an RF oscillator signal;
transmitting, by a transmitter circuit, a first RF fault detection signal derived from the RF oscillator signal, wherein the first RF fault detection signal has a predetermined frequency offset with respect to the RF oscillator signal;
receiving, by a receiver circuit, the first RF fault detection signal as a first RF reception signal via antenna crosstalk coupling with the transmitter circuit;
mixing the first RF reception signal with the RF oscillator signal in order to obtain a first down-converted reception signal;
transmitting, by the transmitter circuit, a second RF fault detection signal derived from the RF oscillator signal, wherein the second RF fault detection signal has the predetermined frequency offset with respect to the RF oscillator signal;
receiving, by the receiver circuit, the second RF fault detection signal as a second RF reception signal via antenna crosstalk coupling with the transmitter circuit;
mixing the second RF reception signal with the RF oscillator signal in order to obtain a second down-converted reception signal;
determining, at the predetermined frequency offset, a first phase of the first down-converted reception signal;
determining, at the predetermined frequency offset, a second phase of the second down-converted reception signal; and
detecting a hardware fault based on a difference between the first phase of the first down-converted reception signal and the second phase of the second down-converted reception signal,
wherein the hardware fault includes at least one RF signal conduction breakage defect in a transmitter signal path of a transmitter circuit or in a receiver signal path of a receiver circuit.

22. The method as claimed in claim 21, wherein the first RF fault detection signal and the second RF fault detection signal are transmitted during predetermined fault detection timeslots, and the RF oscillator signal is transmitted as a radar signal during predetermined target acquisition timeslots.

23. The method as claimed in claim 21, further comprising:
determining a first discrete spectral component of the first down-converted reception signal that corresponds to the predetermined frequency offset based on a Goertzel algorithm, wherein the first phase is a phase of the first discrete spectral component; and
determining a second discrete spectral component of the second down-converted reception signal that corresponds to the predetermined frequency offset based on the Goertzel algorithm, wherein the second phase is a phase of the second discrete spectral component.

24. The method as claimed in claim 23, wherein the hardware fault is detected based on a comparison value between the first phase and the second phase exceeding a predetermined threshold value, the first RF fault detection signal and the second RF fault detection signal being transmitted in two successive fault detection timeslots.

25. The radar device as claimed in claim 18, wherein the receiver circuit is configured to receive the first RF reception signal, the second RF reception signal, the third RF reception signal, and the fourth RF reception signal via a same receiving path.

26. The radar device as claimed in claim 20, wherein the first RF fault detection signal and the second RF fault detection signal are transmitted via a same transmitting path.

* * * * *